United States Patent Office 3,324,039
Patented June 6, 1967

3,324,039
ETHYLENEDIAMINE-N,N-DIMETHYLFORM-AMIDE PAINT-STRIPPING COMPOSITIONS
Myer Rosenfeld, Baltimore, Md., assignor to the United States of America as represented by the Secretary of the Army
No Drawing. Filed July 2, 1964, Ser. No. 380,098
3 Claims. (Cl. 252—153)

The invention described herein may be manufactured and used by or for the Government for governmental purposes, without the payment to me of any royalty thereon.

This invention relates to, and has as its principal objects provision of, novel paint strippers or compositions of matter useful for removing or softening paint and processes employing the same. Both the compositions and the processes are particularly concerned with the removal of paint from nonferrous metal bases.

The paint strippers of this invention are mixtures of ethylenediamine (EDA) and N,N'-dimethylformamide (DMF) in which the EDA:DMF volume ratios (room temperature) vary between about 50:50 and 10:90, respectively, the volume ratios in the 50:50–35:65 range being preferred.

The ethylenediamine-N,N-dimethylformamide mixtures by themselves are corrosive to magneisum. Corrosive attack on this metal can be readily prevented, however, by supplying to the mixtures a small but effective amount of colloidal silica. An effective silica can readily be provided by adding to the paint strippers about 2–3% by volume of a 40° Baumé solution of sodium silicate diluted with four parts of water. The order of addition here is highly important since effective corrosion inhibition is obtained with one order only. N,N-dimethylformamide and the diluted sodium silicate are first mixed with agitation or the resultant mixture is agitated. Ethylenediamine is then added with agitation or the solution is agitated. The explanation of the criticality of the order of addition probably lies in the effect of the dilution on the ultimate particle size of the colloidal silica.

Tolerance to water in these stripping compositions can be improved by adding about 8–10% by volume of ethylene glycol monobutyl ether, tetrahydrofurfuryl alcohol, or the like. Strippers containing about 8–10% by volume of one or more of these chemicals thus constitute a specific aspect of the invention.

The ethylenediamine, N,N-dimethylformamide and other chemicals used in the invention can be of the usual commercial grades.

In its process aspect, the invention comprises contacting a painted surface for a short period of time, usually not more than an hour, and rubbing, if necessary, as with steel wool. Longer contact times, e.g., up to 6 hours, may be necessary if it is desired to strip the paint by a spray of water alone.

It will be evident from the examples below that the invention is especially useful for the removal of aged amine-cured epoxy paints. It is also effective with other paint systems, e.g.: semigloss alkyd enamel; alkyd base, rust-inhibiting iron oxide primer top-coated with lusterless alkyd enamel; nitrocellulose alkyd lacquers; styrenated alkyd lusterless enamels over a primer of zinc chromate-alkyd phenolic resin dispersion; etc.

The invention is particularly useful for the removal of paint on non-ferrous metal bases such as aluminum and magnesium but is equally effective with steel and other ferrous bases. It can also be used even with bases in which magnesium, aluminum and steel are galvanically coupled.

The high flash point, i.e., at least 93° F., constitutes another advantage of these novel paint strippers.

There follow some nonlimiting examples which illustrate the invention. In these examples, temperatures are ambient and parts or percentages are by volume. The ethylenediamine used was more than 98% pure, the initial water content probably being below 1%. Technical grade N,N-dimethylformamide was employed.

Examples 1–12

A series of test runs was conducted in the removal of a baked amine-cured epoxy panel system from finished magnesium.

Dow 17 finished magnesium was obtained by anodizing magnesium in a bath of ammonium acid fluoride, sodium dichromate, and phosphoric acid, at 75 to 100 volts from 1 to 30 minutes at 5 to 50 amps. per square foot. Application is made at about 180° F. to 212° F. Depending upon the particular current density, time of treatment, and temperature used, coatings of 0.0002 to 0.001 inch thick are obtained.

An epoxy paint with ethylenediamine as a curing agent was mixed, applied to an anodized magnesium panel, baked for 20 minutes at 300° F. and cooled. Four drops of various paint stripping compositions, made up with colloidal silica as described above, were placed on the coating and allowed to stand for 25 minutes under a watch glass. Residual stripping composition was blotted with tissue paper and the spot it had occupied on the test panel rubbed with steel wool employed in circular motion. Dirt was wiped off with tissue soaked in the composition under study. Stripping was evaluated visually on a relative percentage basis.

Compositions and results are detailed in the table which follows.

TABLE.—COMPOSITION, PERCENT BY VOLUME

| Example No. | EDA | DMF | Percent Paint Removal |
|---|---|---|---|
| 1 | 100 | 0 | (¹) |
| 2 | 90 | 10 | (¹) |
| 3 | 80 | 20 | 10 |
| 4 | 65 | 35 | 20 |
| 5 | 50 | 50 | 40 |
| 6 | 46.4 | 53.6 | 100 |
| 7 | 43 | 57 | 95 |
| 8 | 35 | 65 | 90 |
| 9 | 30 | 70 | 85 |
| 10 | 20 | 80 | 70 |
| 11 | 10 | 90 | 30 |
| 12 | 0 | 100 | 10 |

¹ Negligible.

It will be noted from the table that an effective paint-stripping mixture is formed at EDA:DMF volume ratios in the range 50:50–10:90. Outside this range, the mixtures have negligible paint-stripping ability on epoxy-base paints.

Having now described my invention, I claim:

1. A paint-stripping composition consisting essentially of ethylenediamine and N,N-dimethylformamide in a volume ratio of about 50:50–10:90, respectively.

2. A composition of claim 1 including about 8 to 10 percent by volume of an additive selected from the group consisting of ethylene glycol monobutyl ether and tetrahydrofurfuryl alcohol.

3. A composition of claim 1 including about 2 to 3 percent by volume of a 40° Baumé solution of sodium silicate diluted with four parts of water.

References Cited

UNITED STATES PATENTS

| | | | |
|---|---|---|---|
| 2,850,461 | 9/1958 | Bloch et al. | 252—364 |
| 3,048,547 | 8/1962 | Vosbigian | 252—153 XR |
| 3,173,876 | 3/1965 | Zobrist | 252—153 XR |
| 3,179,609 | 4/1965 | Morison | 134—38 XR |
| 3,249,075 | 5/1966 | Nelson et al. | 252—387 |

FOREIGN PATENTS 818,331  8/1959  Great Britain.

LEON D. ROSDOL, *Primary Examiner.*

W. E. SCHULZ, *Assistant Examiner.*